3,809,744
PROCESS FOR THE REMOVAL OF NITRIC
OXIDES FROM EXHAUST GASES
Georg von Semel, Schwanenwall, and Eduard Schibilla,
Am Sperrtor, Germany, assignors to Friedrich Uhde
GmbH, Dortmund, Germany
Filed Mar. 29, 1972, Ser. No. 239,103
Claims priority, application Germany, Apr. 6, 1971,
P 21 17 226.9
Int. Cl. B01d 53/34
U.S. Cl. 423—235                    4 Claims

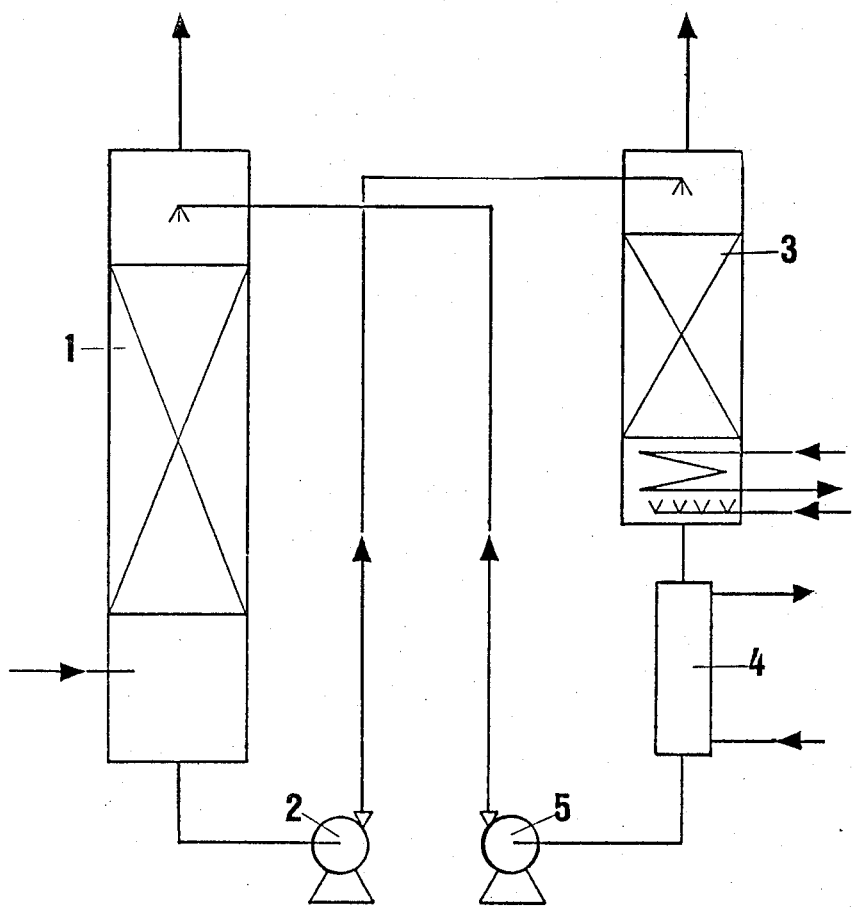

ABSTRACT OF THE DISCLOSURE

A process for the removal of nitric oxides from tail gases such as are contained in large quantities in nitric acid plants. The tail gases are scrubbed with a nitric vanadium (V) solution, and the effluent solution is regenerated by heating it to a temperature ranging from 90° C. to the boiling point and using air as stripping fluid. The regenerated vanadium solution is cooled and then used as scrubbing fluid.

BACKGROUND OF THE INVENTION

The present invention relates to a process for the removal of nitric oxides from tail gases, which are contained in large quantities in nitric acid plants, for example.

Tail gases are commonly known as unusable gas streams that are obtained in chemical plants and discharged to the atmosphere. The residual content of hazardous substances in tail gases is a serious pollution problem. It is imperative to separate hazardous substances from tail gases to the greatest possible extent. The substances eliminated from the tail gases must be converted to an innocuous state or transformed for further utilization.

It is known that the tail gas from nitric acid plants contains both $N_2$ and approximately 2.5 to 3% $O_2$ and, in addition, 1,000 to 2,500 p.p.m. nitric oxides in terms of NO, the latter figures depending on the type of plant and on the mode of operation. Referring to big plants, the emission in terms of $HNO_3$ may be as high as several 100 kg./hr. This emission is a serious problem from the standpoint of air quality standards. Moreover, it entails naturally a certain reduction of the rated nitric acid output.

A number of processes have been developed for reducing the nitric oxide concentrations of tail gases. Among these processes, alkaline absorption and catalytic incineration on platinum catalysts may be cited by way of examples. The disadvantage of these processes is, however, that they are uneconomical for a strong reduction of the nitric oxide concentrations, i.e. the reduction of the nitric oxide concentration will be insufficient when the processes are employed within the limits of process economy.

SUMMARY OF THE INVENTION

The object of the invention is to provide a process for substantially reducing the nitric oxide concentration in tail gases, transferring the nitric oxides for further utilization and avoiding the formation of other waste products.

According to the invention, the problem is solved by scrubbing the tail gases with a nitric vanadium (V) solution and regenerating the effluent solution by heating and stripping with oxygen-bearing gas. The nitric vanadium solution contains preferably 2.0 to 3.0% $V_2O_5$ and 10 to 30% nitric acid. Regeneration of the solution is performed by heating the solution to a temperature ranging from 90° C. to the boiling point and injecting atmospheric air to serve as stripping fluid. In order to safeguard the economy of the process, the invention also provides for reusing the regenerated solution as scrubbing fluid after cooling. The process may be performed both at atmospheric pressure and at any other pressure up to 7 atm.

During the scrubbing step, the pentavalent vanadium is reduced to tetravalent vanadium. During the regeneration step of the process, the tetravalent vanadium contained in the solution is oxidized to pentavalent vanadium while the corresponding quantity of $NO_2$ is discharged. The concentrated $NO_2$ gas obtained can be sent to the absorption towers of the nitric acid plant.

The invention incorporates the particular advantages that the nitric oxide concentration of the tail gases is substantially reduced. The process does not yield any reaction products that might pollute the environment, such as air and wastewater, or which must be reprocessed in elaborate process steps. The nitric oxides absorbed by the vanadium solution are recovered during the regeneration step in the form of concentrated $NO_2$. They may be returned to a nitric acid plant where they contribute to raising the $HNO_3$ yield or may be utilized for other purposes.

BRIEF DESCRIPTION OF THE DRAWING

The figure is a schematic view of an apparatus for carrying out the method according to the invention.

DESCRIPTION OF THE PREFERRED EMBODIMENT

Tail gases containing nitric oxides are introduced into the lower part of oxidation-absorption tower 1 and are scrubbed by a countercurrent stream of vanadium (V) solution. The gas which is substantially freed from nitric oxides is discharged to the atmosphere at the top of oxidation-absorption tower 1. The nitric oxides are oxidized by the pentavalent vanadium of the solution, said vanadium being transferred to the tetravalent form. The solution collecting in the bottom of the oxidation-absorption tower contains more or less tetravalent vanadium depending on the vanadium solution feed rate, on the quantity of exhaust gases and their nitric oxide content. The solution is sent by pump 2 to regeneration tower 3 where it is heated to a temperature in excess of 90° C. At the same time, a small air stream is injected into the heated solution. The tetravalent vanadium previously formed is thereby oxidized while a corresponding quantity of $NO_2$ is formed. The concentration of this $NO_2$ rich gas depends on the quantity of air injected into regeneration tower 3 and on the quantity of vanadium solution and its $V^{4+}$ content. This gas is sent to the absorption section of a nitric acid plant. The hot regenerated vanadium solution is cooled to ambient temperature in cooler 4 and is then sent by pumps 5 to the top of oxidation-absorption tower 1.

The following table summarizes a number of test results that were attained in an equipment system using recycled nitric vanadium solution.

| Test No. | Feed gas, nitrogen with— | | Retention time of the gases in the absorption tower (seconds) | Treated gas, nitric oxides in terms of percent NO (by weight) | Percentage of absorption, percent | Gas with nitric oxides, percent (by weight) |
|---|---|---|---|---|---|---|
| | Nitric oxides in terms of percent NO (by weight) | Oxygen, percent $O_2$ (by vol.) | | | | |
| 1 | 0.29 | 2.7 | 130 | 0.024 | 91.7 | 73 |
| 2 | 0.16 | 2.6 | 9.7 | 0.046 | 71.3 | 82 |
| 3 | 0.088 | 2.7 | 59 | 0.010 | 88.6 | 75 |
| 4 | 0.14 | 2.7 | 20 | 0.024 | 82.6 | 88 |
| 5 | 0.083 | 2.6 | 20 | 0.015 | 81.4 | 80 |

For tests 1 to 4, the total vanadium content of the solution in terms of $V_2O_5$ was 2.5%, the tetravalent form accounting for 6 to 8% (relative) of the total quantity. For test 5, the figure was 1.25% $V_2O_5$ at 7% $V^{4+}$. The content of free nitric acid was 20% by weight, and 10% for test 4. The absorption solution feed rate in the oxidation-absorption tower was 0.16

$$\frac{cm.^3}{cm.^2 \cdot sec.}$$

The temperature in the regeneration tower varied within the range from 98 to 103° C.

What we claim is:

1. A process for reducing the nitric oxide concentration in tail gas from nitric acid plants comprising scrubbing such gases with a nitric vanadium (V) solution containing preferably 2.0 to 3.0% $V_2O_5$ and 10 to 30% nitric acid, and regenerating the effluent solution by heating and stripping with an oxygen-bearing gas.

2. A process according to claim 1, wherein the regeneration of the effluent solution is performed by heating the solution to a temperature ranging from 90° C. to the boiling point, and using air as stripping fluid.

3. A process according to claim 1, wherein the regenerated vanadium solution is re-used as scrubbing fluid after cooling.

4. A process according to claim 1 performed at either atmospheric pressure or any other pressure up to 7 atm.

References Cited

UNITED STATES PATENTS 3,279,884 10/1966 Nonnenmacher et al. __ 423—239
3,429,656 2/1969 Taylor et al. _____ 423—239

EARL C. THOMAS, Primary Examiner

U.S. Cl. X.R.

423—400